April 8, 1958
S. G. BEST
2,829,722
COMBINED FUEL AND BLADE ANGLE CONTROL
Filed Dec. 21, 1954
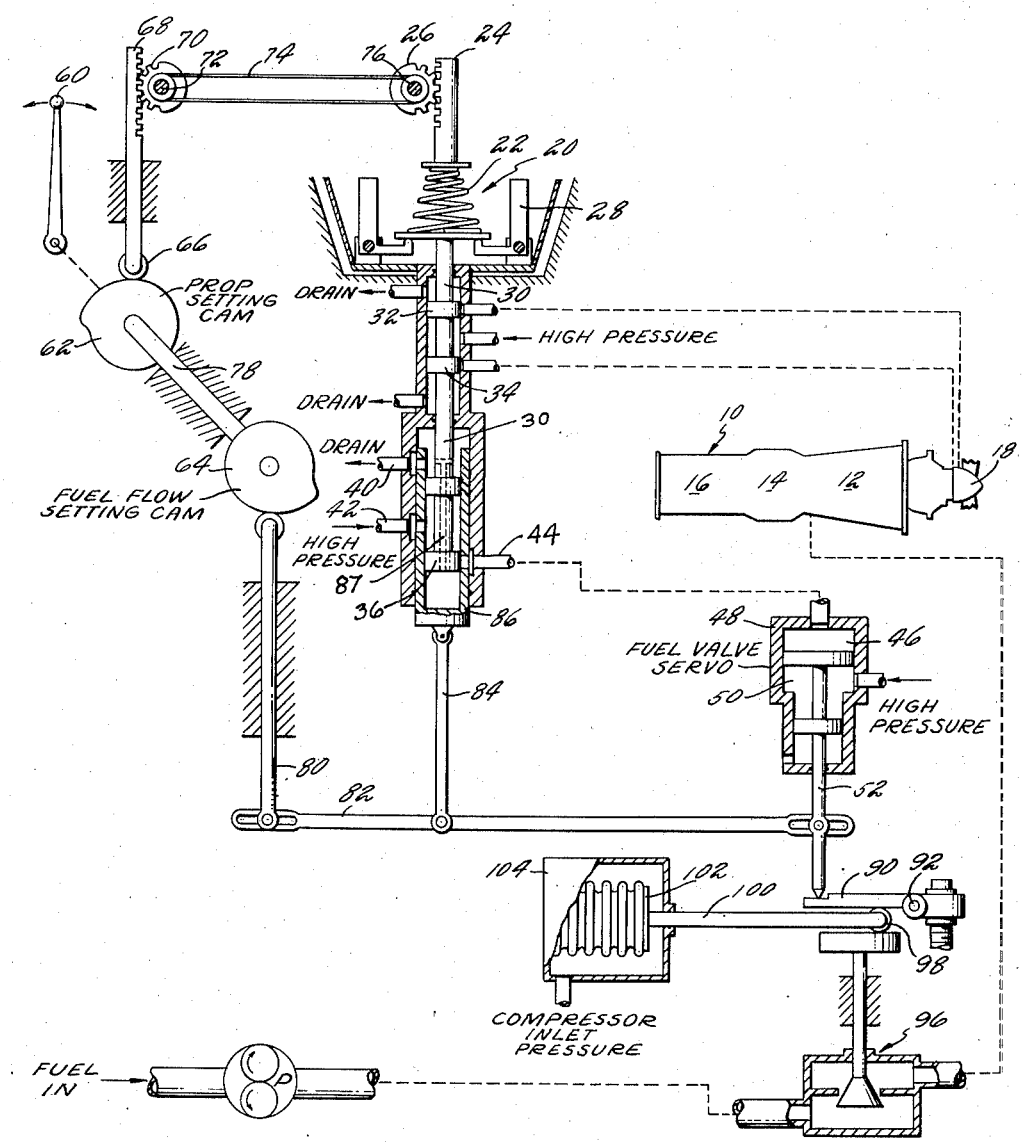
INVENTOR
STANLEY G. BEST
BY Leonard F. Wehlind
ATTORNEY

United States Patent Office 2,829,722
Patented Apr. 8, 1958

2,829,722

COMBINED FUEL AND BLADE ANGLE CONTROL

Stanley G. Best, Manchester, Conn., assignor to United Aircraft Corporation, East Hartford, Conn., a corporation of Delaware Application December 21, 1954, Serial No. 476,716

3 Claims. (Cl. 170—135.74)

This invention relates to turbine power plant controls and more specifically to controls for turboprop power plants.

It is an object of this invention to provide a combined propeller pitch control and fuel control for a turboprop power plant.

It is a further object of this invention to provide a control of the type described which produces high fuel flow sensitivity and avoids tracking error between the blade angle and fuel flow.

It is a still further object of this invention to provide a combined control of the type described for regulating propeller pitch and regulating fuel flow by means of a single speed responsive device which in turn simultaneously controls the propeller pitch and a fuel control servo.

These and other objects of this invention will become readily apparent from the following detailed description of the drawing which illustrates the combined fuel and blade angle control schematically with some of the parts shown in cross section.

A control for a turbo propeller power plant must be capable of providing rapid response to power lever changes and rapid recovery from load disturbances. In order to achieve this some means of compensating for the turbine and propeller time lag must be provided. Such compensation may be included in the propeller control but attempts in this direction have not been very successful. This invention, therefore, relates to providing the compensation by means of a simple droop type fuel control.

One form of device which could provide the proper compensation is one which includes the separate fuel control governor and a governor for the propeller with both governors being set in some desired relation by a single power lever. However, in such a system the fuel flow governor must track exactly with the propeller governor to insure operation on the correct temperature vs. R. P. M. schedule. To obtain the necessary accuracy in such a device it is necessary to sacrifice rapid response so that sluggishness ensues.

As shown in the drawing, the subject invention comprises a system which allows a common governor to be used for both the propeller and the fuel flow control. As shown herein, a turboprop power plant is generally indicated at 10 and includes a compressor section 12, a combustion section 14 and a turbine and exhaust section 16. As is well known, at least a portion of the turbine section is arranged to drive a variable pitch propeller 18. The propeller may be of the type shown in the Caldwell el al. Patent No. 2,174,717 or the Martin Patent No. 2,361,954. A single governor is generally indicated at 20 as having a speeder spring 22 which can be set or adjusted by a rack 24 and pinion 26. Flyweights 28 are rotated in any suitable manner in timed relation with the power plant and propeller so that the flyweights 28 will oppose the pressure of the speeder spring 22. Centrifugal forces acting on the flyweights will provide motion to the valve stem 30. Vertical motion of the valve stem 30 will move lands 32, 34 and send high pressure fluid to either side of the propeller pitch changing servomotor while the other side of the servomotor is connected to drain. The propeller pitch changing servo motor may be of the type schematically illustrated in my copending application Serial No. 476,646, filed as of even date. The valve stem 30 carries another land 36 which controls the flow of either drain or high pressure fluid from the lines 40, 42, respectively, to the line 44 leading to the chamber 46 of a fuel valve servomotor 48. High pressure fluid is continuously supplied to the chamber 50 of the servomotor 48 so that when high pressure is directed to the chamber 46, piston rod 52 will be moved downwardly inasmuch as the forces act over a larger piston area. Likewise, when drain pressure is supplied to the chamber 46 the piston rod 52 will move upwardly since the chamber 50 is continuously supplied with high pressure.

A single power lever 60 is provided. This power lever may be arranged with any suitable coordinating mechanism. However, as illustrated herein, the power lever rotates a propeller setting cam 62 and a fuel flow setting cam 64. The cam 62 has a follower 66 which in turn imparts motion to a rack 68 and a pinion 70 which in turn is connected by a pulley 72 and a cable 74 to a pulley 76 fixed for rotation with the pinion 26. Hence any rotation of the shaft 78 will reset the speeder spring 22 of the governor 20. When the propeller speed is reset the fuel flow setting cam 64 will simultaneously be rotated and this will impart vertical motion to the rod 80. Movement of the rod 80 rotates the rod 82 about its right-hand end so that motion is imparted to the rod 84 and a sleeve 86 which surrounds the land 36. The sleeve 86 is intended to be a follow-up device to cause the piston of servomotor 48 to assume a position proportional to the movement of the pilot valve 32 when any speed error occurs as signalled through the governor, and proportional in addition, to the setting of the power lever.

The fuel valve servo 48, when operated as a result of a speed error signal resulting from motion of the land 36, tends to rotate the rod 82 about its left end to keep the follow-up sleeve 86 lined up with the pilot valve land 36 at all times. As a result then the position of the servomotor piston is the sum of the setting of the cam 64 plus a movement proportional to R. P. M. error. Of course, during steady-state operation R. P. M. error reduces to zero.

Movement of the valve stem 30 either up or down opens passage 44 to drain or pressure allowing flow to or from servo chamber 46 which imparts motion to servo piston rod 52. This motion is transmitted to follow-up arms 82, 84 and to sleeve 86 to close off passage 44 as the main servo piston reached a position proportional to speed error.

For an overspeed condition the pilot valve stem 30 will be lifted by the action of the flyweights 28. Low pressure or drain fluid then flows to passage 44 by means of passage 87. This low pressure fluid allows servo piston rod 52 to move upwardly causing sleeve 86 to move in an upward direction as a result of the follow-up action of lever 82. Passage 44 is then closed off thereby causing servo piston rod 52 to assume a position which is proportional to speed error since the rate of movement of sleeve 86 is proportional to the rate of movement of piston rod 52.

The rod 52 engages a link 90 which is pivoted at 92. Any motion of the link 90 will tend to open or close the fuel valve 96 via the roller 98. The roller 98 can be moved laterally in relation to the link 90 by means of the rod 100 which is actuated by a sealed bellows 102. Bellows 102 is fixed at one end to a casing 104 which receives compressor inlet pressure. The bellows can be made to respond to both compressor inlet pressure and temperature and as a result modulates the action of the fuel valve servomotor 48 to insure operation on the correct temperature schedule for the power plant. If desired, stops may be provided to establish maximum and minimum fuel flow limits. These stops may engage the piston of the servomotor 48, or the limits of the travel of the servomotor piston within its casing may provide the desired limits. It may also be desired to provide a hydraulic stop operated from a three dimensional cam with the cam moved in one sense by temperature and in another sense by R. P. M. to schedule acceleration temperature and surge limit.

The use of a common governor as disclosed herein eliminates any tracking error between blade pitch and fuel flow so that a high fuel flow sensitivity (steep droop) may be used.

As a result of this invention a very simple, efficient and highly sensitive control has been provided.

Although only one embodiment of this invention has been illustrated and described herein, it will be apparent that various changes and modifications may be made in the construction and arrangement of the various parts without departing from the scope of this novel concept.

What it is desired to obtain by Letters Patent is:

1. In a turboprop power plant including a propeller having variable pitch blades, means for regulating the pitch of said blades, a source of fuel under pressure, means for regulating the flow of fuel from said source to the power plant, speed responsive means operatively connected to and simultaneously controlling said pitch regulating means and said fuel regulating means including valve mechanism, a source of power, a servo device operatively connected to said fuel regulating means and controlled by said valve mechanism, follow-up means operatively connected to said servo device and said valve, and a manual control having operative connections to said speed responsive means and including a separate connection to said servo device.

2. In a turboprop power plant including a propeller having variable pitch blades, means for regulating the pitch of said blades, a source of fuel under pressure, means for regulating the flow of fuel from said source to the power plant, speed responsive means operatively connected to and simultaneously controlling said pitch regulating means and said fuel regulating means, said fuel regulating means including a servo device, follow-up means forming a separate connection from said servo device to said speed responsive means, and a power lever for setting said speed responsive device, said power lever including a separate operative connection to said servo device.

3. In a turboprop power plant including a propeller having variable pitch blades, means for regulating the pitch of said blades, a source of fuel under pressure, means for regulating the flow of fuel from said source to the power plant, speed responsive means operatively connected to and simultaneously controlling said pitch regulating means and said fuel regulating means including valve mechanism, said valve mechanism including two sets of controlling lands, each of said sets adapted to control one of said regulating means, a source of power, a servo device operatively connected to said fuel regulating means and controlled by said valve mechanism, follow-up means operatively connected to said servo device and said valve including a follow-up sleeve cooperating with one of said sets of lands, and a power lever for setting said speed responsive means, said power lever including a separate operative connection to said follow-up sleeve.

References Cited in the file of this patent
UNITED STATES PATENTS

| 2,306,953 | Jung | Dec. 29, 1942 |
| 2,631,677 | Kochenburger | Mar. 17, 1953 |
| 2,645,293 | Ogle et al. | July 14, 1953 |
| 2,667,228 | Wood et al. | Jan. 26, 1954 |